United States Patent

Chauvet et al.

[11] 3,788,634
[45] Jan. 29, 1974

[54] SHEET POSITIONING APPARATUS

[75] Inventors: Edmond Chauvet, Parthenay; Andre Prevote, Malvaut Par Cherveux, both of France

[73] Assignee: L'Air Liquide, Societe Anonyme pour l'Etude et l'Exploitation des Procedes Georges Claude, Paris, France

[22] Filed: Sept. 22, 1972

[21] Appl. No.: 291,374

[30] Foreign Application Priority Data
Sept. 24, 1971 France .............................. 71.34506

[52] U.S. Cl. ................. 269/154, 219/160, 219/161, 228/44, 228/50
[51] Int. Cl. ......................... B25b 1/00, B23c 19/00
[58] Field of Search ..... 269/86, 139, 154, 155, 156; 228/4, 44, 50; 219/158, 160, 161

[56] References Cited
UNITED STATES PATENTS

| 2,941,491 | 6/1960 | Knost | 269/154 X |
|---|---|---|---|
| 3,122,118 | 2/1964 | Cooper | 269/139 X |
| 3,307,764 | 3/1967 | Robinson | 228/50 X |
| 2,078,365 | 4/1937 | Biggert et al. | 219/161 X |
| 3,275,794 | 9/1966 | Dubusker et al. | 228/44 X |
| 1,449,369 | 3/1923 | Anderson | 219/158 X |
| 1,573,360 | 2/1926 | Shoenberger | 219/160 X |
| 1,546,250 | 7/1925 | Phillips | 228/50 X |
| 2,613,303 | 10/1952 | Babbitt | 228/50 X |

FOREIGN PATENTS OR APPLICATIONS

| 866,603 | 4/1961 | Great Britain | 228/44 |
|---|---|---|---|
| 969,093 | 9/1964 | Great Britain | 219/161 |

Primary Examiner—Harold D. Whitehead
Assistant Examiner—J. T. Zatarga
Attorney, Agent, or Firm—Young & Thompson

[57] ABSTRACT

This invention relates to apparatus for positioning sheet material which is to be welded together edge to edge and of the type in which these edges are held in the welding position by means of movable jaws arranged longitudinally and being brought by drive means into a clamping position with respect to said edges against a fixed longitudinal girder. The invention provides that the movable jaws are arranged of either side and above the fixed girder forming a lower support and these jaws are also firmly fixed to jaw carriers mounted with transverse guides on one or the other of two upper longitudinal support girders. These guides converge substantially towards the line of weld and drive means are arranged between each jaw carrier and the associated upper support girder.

6 Claims, 4 Drawing Figures

SHEET POSITIONING APPARATUS

The present invention relates to apparatus for positioning a welded or shaped flat sheet or sheets for the purpose of welding it or them from the outside or from the inside, i.e. from a position above or below the sheet position.

Apparatus is known which enables flat, curved or shaped sheets to be positioned. However, in the case of curved or shaped sheets, the positioning of the longitudinal lips allows these edges to be welded from the outside but not from the inside, i.e. from a position above but not below the sheet. These apparatus are made up of girders on which are arranged lever-gates whose relatively large size prevents them from being brought into position on the inside of shaped sheets or circularly-profiled sheet of small diameter. In their setting-up motion the clamping levers, which act on the jaw-carriers by means of compressed gas or another pressure means, bring together the edges of the sheet to be welded either not at all or only very little, which prevents them being perfectly butted in particular in the case of runs of considerable length and circularly-profiled material of small diameter. Furthermore the length ratios of the clamping lever-arms are such that they do not allow the best use to be made of the force supplied by the compressed air generally used as an energy source to operate these levers.

In another known apparatus the edges of the sheet are held in the welding position by means of movable jaws arranged longitudinally and bearing, by drive-means, against a fixed longitudinal girder, the said edges being clamped. This apparatus, which is of compact design, effectively enables longitudinal welding to be performed on sheets rolled into circular profiles of widely differing diameter. Nevertheless, its design is such that there is grave risk of the edges moving apart when welding is carried out.

It is an object of the invention to provide a positioning apparatus which, when it is put into operation, tends to move the edges or lips to be welded together, or to hold them in close contact.

A further object of the invention is to provide apparatus which is even more compact than that which is already known and which enables even smaller diameter circular profiles to be welded from the inside.

Another object is to provide positioning apparatus with a support girder which enables gas to be fed to the back of the weld and/or welding also to be carried out using the powder-flux technique.

Apparatus according to the invention is characterised in that the movable jaws are arranged on either side of and above the fixed girder forming the lower weld-support girder, the said jaws being firmly attached to jaw-carriers mounted in transverse guides on one or other of the two upper longitudinal support-girders, the said guides converging substantially towards the line of weld, while drive-means are arranged between each jaw-carrier and the associated upper support-girder.

With this apparatus it is possible to position the longitudinal lips of curved or shaped sheets for the purposes of welding either from the outside or the inside, i.e. from a position above or below the sheet.

With this same apparatus it is also possible, with the addition of roller or ball-bearing supports for the entry and withdrawal of the sheets, to join flat sheets together.

In apparatus according to the invention the girders may be orientated so as to be of small transverse size while retaining adequate strength and rigidity. It is then possible to make welds on curved or shaped sheets by placing the welding means inside the latter.

The action of the jaw-carrying means is such that it enables the longitudinal lips of the sheet or sheets to be assembled to be moved towards one another until they are brought into abutment even in the case of runs of considerable length and circular-profile material of relatively small diameter.

These jaw-carrying means transmit the motive power directly and thus enable the maximum efficiency to be obtained from the latter.

In order that the invention may be more clearly understood, reference will now be made to the accompanying drawings which show one embodiment thereof by way of example, and largely diagrammatically, and in which.

Figure 1:
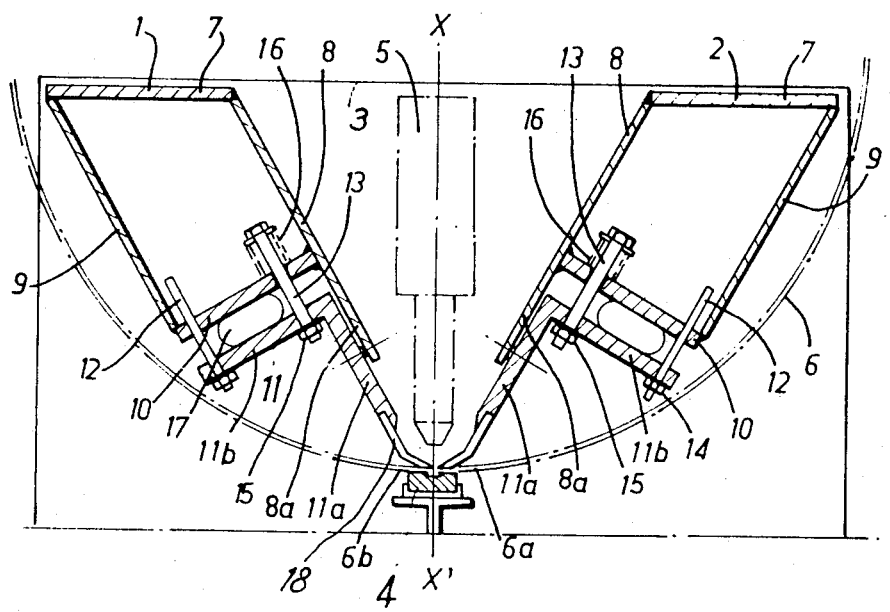
FIG. 1 shows a cross-sectional view of apparatus according to the invention.
Figure 2:
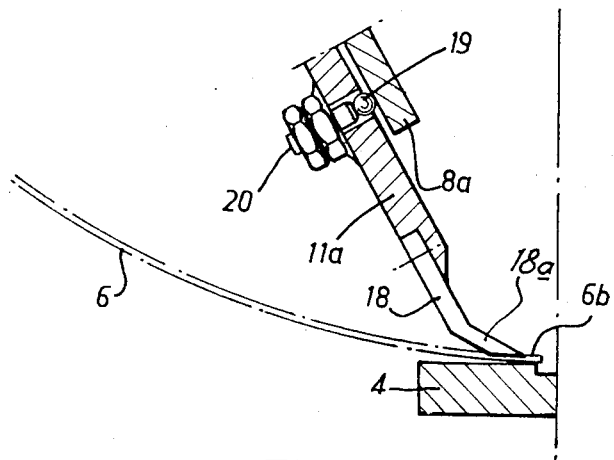
FIG. 2 shows a cross-sectional view of a detail of the apparatus of FIG. 1.

Referring to FIGS. 1 and 2, there is therein shown apparatus which includes two symmetrical, horizontal, and mutually parallel support-girders 1 and 2 which are anchored to the upper part of a frame-work 3 which includes in its lower part a weld-support girder 4 for the article to be welded which is situated vertically below the axis of symmetry of the two girders 1 and 2.

Between the girders 1 and 2 is situated a welding device 5 with applicator electrodes to produce a weld between the edges 6a and 6b of a circular profile or ring 6 placed on the support girder 4 and enclosing the whole of the devices for welding and holding in position.

Each of the support girders 1 and 2 is made up of a horizontal upper sole-plate 7, to which are attached two lateral flanges 8 and 9. The inner flange 8 is deeper than the outer flange 9, to form, in association with a lower sole-plate 10, an angled portion 8a–10 into which fits a jaw-carrying means which may be a jaw-carrying angle 11 with wings 11a and 11b. Guide-rods 12 and 13 fixed to the wing 11b of the jaw-carrying angle-iron 11 by nuts 14 and 15 pass through the lower sole-plate 10 of the support girder 1 (2) to enable the angle 11 to slide by means of its wing 11a on the lower face of the inside flange 8a.

Return-springs 16 tend to pull the guide-rods 12 and 13 up into the box formed by each support girder 1 (2) thus compressing a flexible and resistant cushion or envelope 17 placed between the wing 11b of the angle and the lower sole-plate 10 of the support girder 1 (or 2). At the ends of the wings 11a of the angles 11 are fixed jaws 18. The jaws are curved inwards at 18a so as to increase their convergent pressure in the direction of the guide-rods 12 and 13.

As can be seen in the drawing, the two inside flanges 8 of the support girders 1 and 2 are inclined downwards and towards one another to form an angle whose apex is situated substantially at the level of the weld-support girder 4. In this way the jaw-carriers 11 slide by means of their wings 11a on the flange 8 and along the axis of the guide-rods 12 and 13 and move towards one another in such a way that the ends 18a, which are curved towards one another, move together when the jaw-carriers are moved downwards towards the weld-support girder 4, remaining, naturally, slightly back from the edges, or lips, 6a, 6b of the tube 6.

The cushion 17 is fitted with a tube connected by a valve to a source of compressed gas (not shown in the drawing) and is capable of deformation and inflation by increase of pressure which causes the jaw-carrying angle 11 to move in the direction of the guide rods 12 and 13.

In FIG. 2 a means of correcting the directional orientation of the jaw-carrying angle consists of a stop 19 fitted with a ball-bearing rolling on the inside face of each inside flange 8a of the support girder 1 (2) by means of an adjusting screw 20 whose end bears on the ball-bearing 19 and whose thread engages in a tapped hole in the wing 11a of the jaw-carrying angle 11 in such a way as to move the web 11a away from or towards the inside flange 8a. This directional orientation-correction means has, in addition, the advantage of preventing the angle 11 from jamming when moving down for clamping.

The operation of the apparatus is as follows: when the apparatus is in the withdrawn position, that is to say when the jaw-carrying means 11 are moved towards the support girders 1 and 2 by the envelopes 17 being deflated and by the action of the springs 16, a curved ring 6 or a rolled-up plate of which the adjacent edges 6a, 6b are to be welded together, is placed on the work-piece support 4, with the edges resting on the work-piece support girder 4. After this, the envelopes 17 are pressurized and, as they inflate, cause the jaw-carrying means 11 to move forward until the jaws 18 take up a convergent clamping position against the inside wall of the ring on either side of the edges 6a and 6b to be welded which moves them towards one another. After this, the welding operation is carried out.

Figure 3:
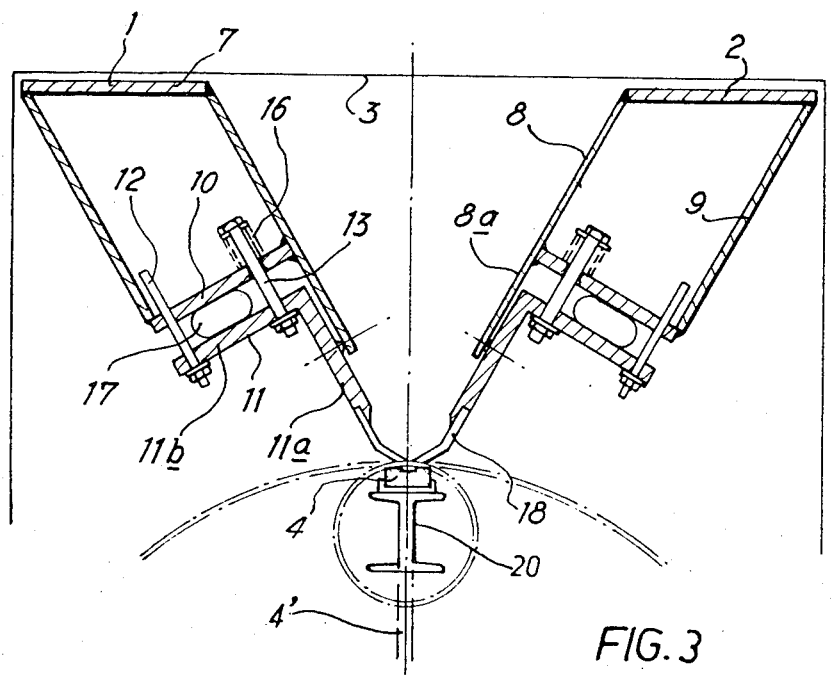
FIG. 3 shows a cross-sectional view of the same apparatus when used for the external welding of circular profiles.

Fig. 3 shows the application of the apparatus shown in FIGS. 1 and 2 to the welding from the outside of small diameter circular-profile material or rings where a support girder 20 of small cross-section is used.

Figure 4:
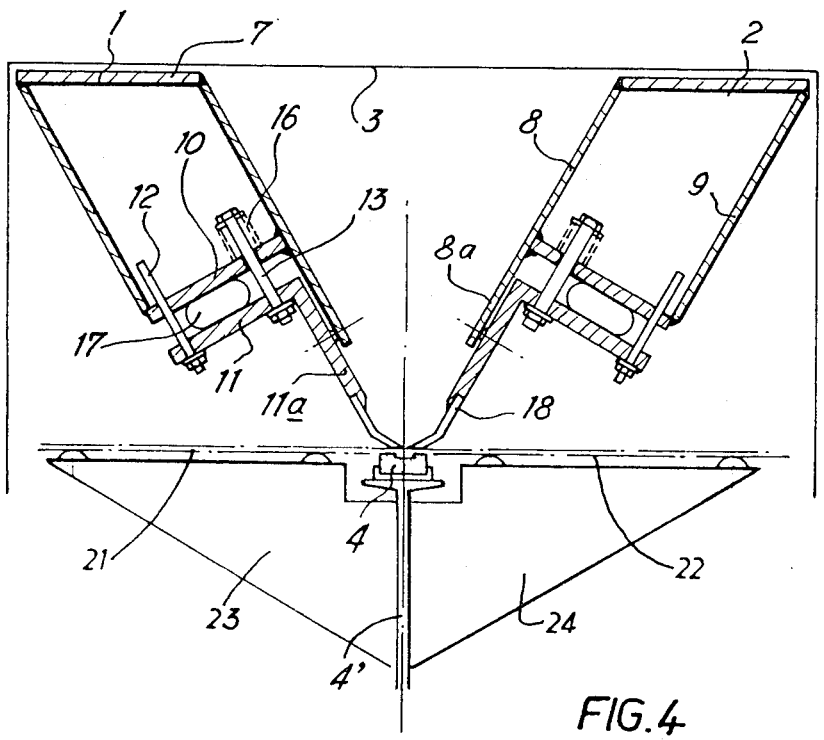
FIG. 4 shows a cross-sectional view of the same apparatus when used for joining flat sheets.

In the case of FIG. 4 the apparatus according to FIGS. 1 and 2 is used for joining two flat sheets 21 and 22. At the axis 4' of the work-piece support girder 4 are fixed lateral supports 23 and 24 fitted in their upper parts with rollers or ball-bearings against which bear each of the sheets 21 and 22, which are introduced or withdrawn laterally.

As is apparent from the foregoing description the apparatus described enables the edges of one or more pieces of sheet which are to be welded to be held in position and the clamping operation always tends to move the edges to be welded towards one another, as far as this is possible. The apparatus described may easily be fitted with means for feeding gas to the back of the weld. It is also very easy to fit it with means for feeding powder for flux-powder welding. It will be noted that the clamping of the jaws is carried out, advantageously in an independent manner, against a lower support girder which may be bedded in the ground, which can be done without flexure of the girder if the bedding is effected under clamping. It will also be noted that, during the clamping operation, the parts of the work-piece to be welded stay immobolized on their support.

The apparatus described may be used whenever it is necessary to have:

a. either a setting-up jig to weld shaped or tubular rolled sheets from the inside, the minimum dimensions of the girders being a function of the length of the welds to be produced and of the welding apparatus used.

b. or a setting-up jig to weld shaped or tubular rolled sheets of different length from the outside.

c. or a joining jig for flat sheets of different length.

We claim:

1. Apparatus for positioning to be welded edge to edge sheet material having either a flat or a circular profile, comprising a lower support girder to carry the adjacent edges of said sheet material and an upper device for holding said sheet material in position on said lower support girder, said holding device comprising a pair of upper support girders disposed above said lower support girder symmetrically with respect to the latter and on either side thereof, said upper girders having flanges inclined downward and toward each other to form an angle the apex of which is situated substantially at the level of said lower support girder, jaw-carrying means slidably mounted on each of said flanges, guide means for said jaw-carrying means, said guide means being mounted on said upper support girders and converging substantially toward said lower support girder, drive means for moving said jaw-carrying means in translation along said inclined flanges, and a pair of jaw members fastened to said jaw-carrying means and arranged to engage the respective edges of said sheet material whereby a downward sliding motion of said jaw carrier actuated by said drive means effects a converging motion of said jaw members to urge said adjacent edges against each other.

2. Apparatus according to claim 1, wherein said jaw-carrying means comprise a longitudinal angle-iron on one wing of which said guide means are located and on the other wing of which said jaws are attached.

3. Apparatus according to claim 2, wherein each said angle-iron has mounted thereon correction means for adjusting its directional orientation relative to said inclined flange of the respective upper girder.

4. Apparatus according to claim 3, wherein said correction means comprises a thrust ball bearing rolling on said inclined flange and an adjusting screw engaging said thrust ball bearing to move the latter away from or toward said inclined flange.

5. Apparatus according to claim 2, wherein each of said upper support girders comprises a lower soleplate and wherein said guide means include guide rods sliding in said lower sole plate, at least one of said guide-rods having return springs.

6. Apparatus according to claim 5, wherein said drive means comprises an inflatable cushion interposed between said soleplate and said angle-iron.

* * * * *